United States Patent
Jackson

(10) Patent No.: US 7,262,384 B2
(45) Date of Patent: Aug. 28, 2007

(54) REACTION VESSEL AND METHOD FOR SYNTHESIZING NANOPARTICLES USING CYCLONIC GAS FLOW

(75) Inventor: Douglas K. Jackson, Austin, TX (US)

(73) Assignee: NovaCentrix, Corp., Austin, TX (US)

( * ) Notice: Subject to any disclaimer, the term of this patent is extended or adjusted under 35 U.S.C. 154(b) by 320 days.

(21) Appl. No.: 10/955,573

(22) Filed: Sep. 30, 2004

(65) Prior Publication Data
US 2006/0086698 A1    Apr. 27, 2006

(51) Int. Cl.
*B23K 10/00* (2006.01)

(52) U.S. Cl. .................... 219/121.43; 219/121.59; 219/121.36; 315/111.21; 75/10.19

(58) Field of Classification Search ............ 219/121.43, 219/121.4, 121.48, 121.51, 121.36, 121.59; 110/246, 346; 75/10.13–10.19; 315/111.21, 315/111.51; 313/231.31, 231.41
See application file for complete search history.

(56) References Cited

U.S. PATENT DOCUMENTS

| | | | |
|---|---|---|---|
| 3,953,184 A | 4/1976 | Stockford et al. | 55/458 |
| 4,206,174 A | 6/1980 | Heffley et al. | 422/144 |
| 4,394,138 A | 7/1983 | Schilling | 55/1 |
| 4,699,588 A | 10/1987 | Zinn et al. | 432/58 |
| 4,702,181 A | 10/1987 | Brown | 110/264 |
| 4,770,626 A | 9/1988 | Zinn et al. | 431/1 |
| 4,881,476 A | 11/1989 | Becker et al. | 110/347 |
| 5,279,727 A | 1/1994 | Helstrom et al. | 208/161 |
| 5,321,327 A * | 6/1994 | Jensen | 310/11 |
| 5,362,379 A | 11/1994 | Helstrom | 208/161 |
| 5,514,349 A | 5/1996 | Parker et al. | 422/186.21 |
| 5,738,712 A | 4/1998 | Hyppanen | 95/271 |
| 6,017,381 A * | 1/2000 | Dunn et al. | 95/3 |
| 6,022,390 A | 2/2000 | Jakkula | 55/345 |
| 6,141,826 A | 11/2000 | Conrad et al. | 15/347 |
| 6,146,597 A | 11/2000 | Nishida et al. | 422/147 |
| 6,391,095 B1 | 5/2002 | Conrad et al. | 95/271 |
| 6,531,066 B1 | 3/2003 | Saunders et al. | 210/787 |
| 6,579,334 B2 | 6/2003 | Oh et al. | 55/426 |
| 6,601,526 B2 | 8/2003 | Gutmark et al. | 110/346 |
| 6,672,461 B2 | 1/2004 | Miller et al. | 209/722 |
| 2004/0065170 A1* | 4/2004 | Wu et al. | 75/10.13 |
| 2005/0054516 A1* | 3/2005 | Vaughn et al. | 502/64 |

* cited by examiner

*Primary Examiner*—Mark Paschall
(74) *Attorney, Agent, or Firm*—Winstead PC; Jerry M. Keys

(57) ABSTRACT

A reaction vessel and a method for efficiently producing and collecting nanoparticles in the reaction vessel using cyclonic gas flow. Gas is injected through an inlet tangentially positioned relative to the axis of the vessel to cause the gas to form an outer helical vortex flow and an inner helical vortex flow within the vessel. A reaction synthesizer is operated within the inner helical vortex to produce nanoparticles and larger byproduct particles from precursor materials. The double helical vortex conveys the byproduct particles to an outlet for collection responsive to the cyclonic flow and gravity and an outlet downstream of the inner helical vortex collects the nanoparticles. The vortices formed in the reaction vessel minimize buildup on walls of the reaction vessel and provide a way to rapidly move the synthesized nanoparticles out of the reaction vessel.

22 Claims, 5 Drawing Sheets

REACTION VESSEL AND METHOD FOR SYNTHESIZING NANOPARTICLES USING CYCLONIC GAS FLOW

TECHNICAL FIELD

The present invention relates in general to reaction vessels and, in particular, to reaction vessels with cyclonic gas flow.

BACKGROUND OF THE INVENTION

Synthesis of nanopowder can be conducted within a closed vessel using various processes. U.S. Pat. No. 6,777, 639 ("the '639 patent") describes a repetitive pulsed power nanopowder synthesis technique. In this process, a high-magnitude current pulse creates a high-density plasma from a quantity of precursor material that results in the production of nanoparticles held in a gas suspension. U.S. Pat. No. 5,460,701 describes a continuous arc process used to produce gas suspensions of nanopowder. A reaction vessel is needed that aids in the collection of the particles from the gas in which they are suspended.

In the above nanoparticle synthesis devices, a continuous flow of gas (a "quench gas") serves as the cooling medium for the hot plasma from which the nanoparticles are synthesized. For a given nanoparticle production rate, the flow rate of this gas needs to cool the reaction products to a temperature below the rated temperature of components downstream of the reaction vessel such as piping, filters, and blowers. This quench gas is also used to convey suspended nanoparticles from the reaction vessel into a powder collection device such as a filter or electrostatic precipitator. The gas flow rate needs to clear the reaction zone of suspended nanoparticles, because suspended particles lingering in the production zone can serve as nucleation sites for the growth of larger, undesirable particles. It is therefore desirable to design the reaction vessel in such a way as to promote the smooth flow of suspended nanoparticles out of the reaction zone.

During operation, the pulsed-power process (as described in the '639 patent) generates a plasma that violently expands and mixes with the gases within the vessel. It is desirable to contain this rapid expansion within a relatively large reaction vessel to minimize contact between the walls of the reaction vessel and the hot expanding reaction products. Using a large reaction vessel prevents the vessel walls from physically interfering with the nanoparticle synthesis process and prevents damage to the reaction vessel walls. However, the large size of the vessel can lead to large zones of relatively slow-moving gas within the reaction vessel, especially if the diameter of the reaction vessel is significantly larger than the gas inlet piping. These stagnant zones allow suspended particles to linger within the reaction vessel, interfering directly with the synthesis process as well as forming opaque clouds that may interfere with optical instrumentation used to monitor the process. To sweep the particles out faster it is often necessary to increase the gas flow rate to well above the rate required to cool the reaction products. This potentially can interfere with the synthesis of the reaction products. Moreover, increasing the quench gas flow rate requires the added expense of using larger gas handling components (piping, blowers, collection filters, heat exchangers, etc.). Thus, it is desirable to employ a reaction vessel geometry that minimizes the gas flow rate required to remove the suspended nanopowder from the reaction vessel.

SUMMARY OF THE INVENTION

The present invention addresses the foregoing needs by providing a method, apparatus, and system for conducting reactions within a reaction vessel having cyclonic gas flow. One embodiment of the present invention is a method for synthesizing a material, such as nanopowder. For the purposes of the present invention, Applicants' discussion is directed toward nanopowders. The invention is further applicable to other-sized materials that are suspended within the reaction vessel. The method includes creating a cyclonic flow of a gas within a reaction vessel. The cyclonic flow of gas includes an outer helical vortex and an inner helical vortex. The method includes synthesizing a plurality of nano-sized particles and collecting the nano-sized particles from an outlet nozzle positioned downstream of the inner helical vortex gas flow.

Another embodiment of the present invention is a reaction chamber for synthesizing nanopowder. The reaction chamber includes a portion such as a cylindrical portion with an inner wall. The reaction chamber includes an inlet through which gas flows in a tangential direction along the inner wall to form an outer helical vortex. The embodiment includes a means for synthesizing nanopowder that generally creates both nano-sized particles and, as a byproduct, larger particles. The embodiment includes an outlet positioned downstream of the inner helical vortex gas flow to collect the nano-sized particles. The embodiment can also include a second outlet for collecting the larger particles created as a byproduct. In another embodiment, the reaction vessel has a conical-shaped portion attached to the cylindrical portion for enhanced collection and separation of particles.

The foregoing has outlined rather broadly the features and technical advantages of the present invention in order that the detailed description of the invention that follows may be better understood. Additional features of the invention will be described hereinafter.

BRIEF DESCRIPTION OF THE DRAWINGS

For a more complete understanding of the present invention, refer to the following descriptions and the accompanying drawings, in which.

DETAILED DESCRIPTION

Figure 1:
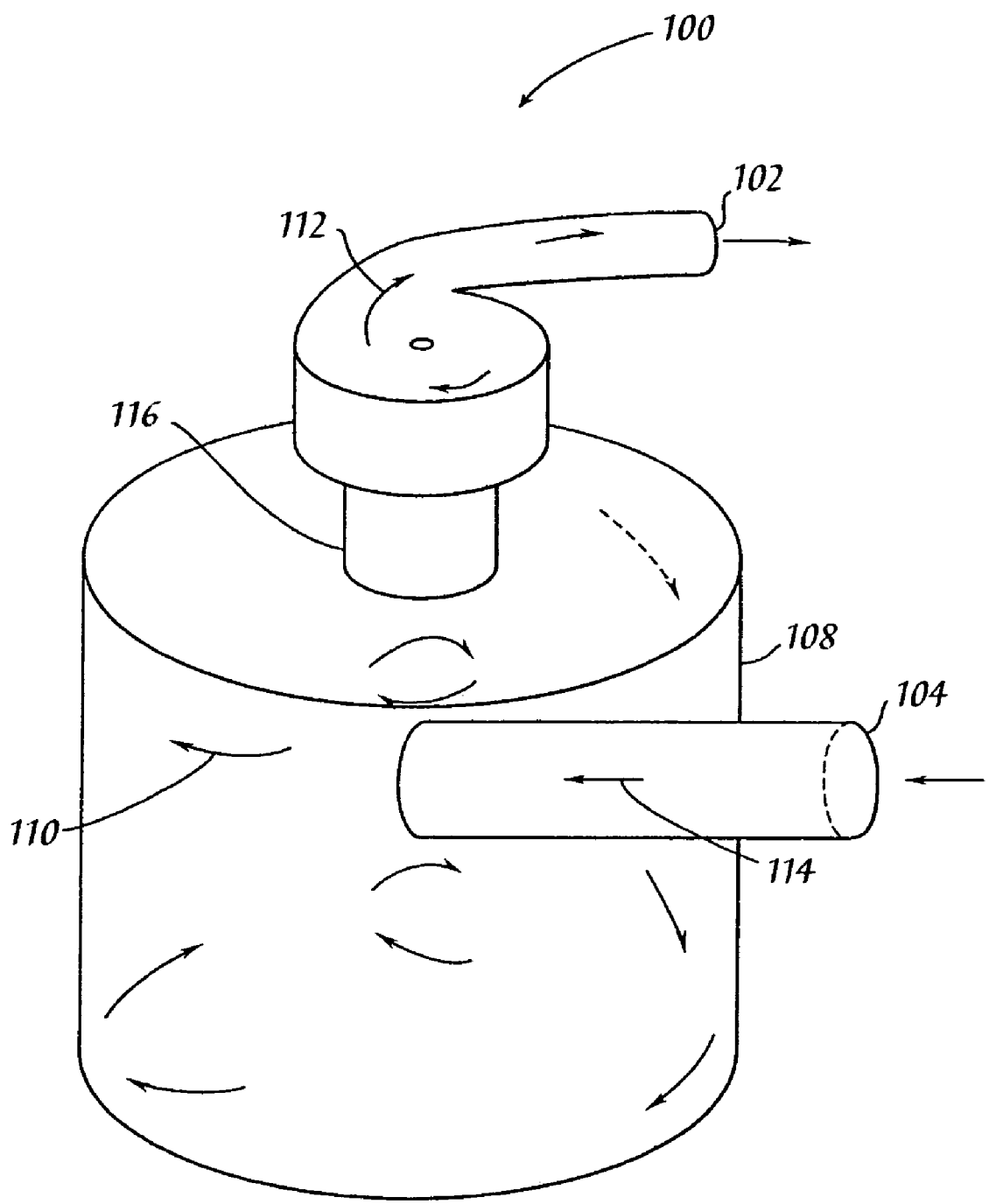
FIG. 1 is a diagram of a reaction vessel having cyclonic flow and one outlet nozzle in accordance with an embodiment of the present invention.

In the following description, numerous specific details are set forth regarding the production of nanopowder and nanoparticles to provide a thorough understanding of the present invention. However, it will be obvious to those skilled in the art that the present invention may be practiced in other contexts than the production of nanoparticles and nanopowder. In other instances, well-known systems have been shown in block diagram form in order not to obscure the present invention in unnecessary detail. For the most part, details concerning controlling gas flow rates, controlling the reaction within the reaction vessel, and the like have been omitted inasmuch as such details are not necessary to obtain a complete understanding of the present invention. Further, such details are within the skills of persons of ordinary skill in the relevant art. Also, the present invention may be practiced using means for synthesizing nanopowders other than the means described in this patent.

The following terms shall have the definitions given below when used in either lower case or with capitalization in this specification:

"Nanopowder" shall mean nanomaterial primarily comprised of nanoparticles that are of a size of 1-500 nanometers (nm).

"Precursor Material" shall mean material that is processed to produce nanopowder.

"Byproducts" shall mean material removed from a body of precursor material generally having a size of 10 micron ($\mu$m) or larger.

"Ablative Material" shall mean material removed from a body of precursor material due to the combined effects of heat transfer and mechanical shear caused by plasma velocities.

In general, larger reaction vessels require a greater flow rate of gas to sweep out particles for a given time period. Also, increased flow rates require larger blowers, piping, and related equipment. Therefore, to minimize costs, it is desirable to direct the gas through the reaction vessel in such a way as to minimize the volume flow rate of gas required to sweep the reaction products out of the tank. In addition, if the inlet pipe is considerably smaller in diameter than the reaction vessel itself, a jet of gas flowing into the relatively stagnant tank can cause considerable random mixing within the tank that can delay the complete removal of particles from the tank. This mixing effect is therefore undesirable. This mixing effect can be minimized by employing an inlet diffuser, which slows and expands the jet of incoming gas so that it flows uniformly from one end of the reaction vessel to the other. Such a diffuser could consist of a long, gently tapering section of inlet pipe that gradually expands from the diameter of the inlet pipe to the diameter of the reaction vessel. Alternatively, the diffuser could consist of a matrix of baffles or other flow redirecting elements located within the reaction vessel. Either such diffuser is likely to be large and expensive compared to the size and cost of the reaction vessel itself. Therefore, the vessel size and manner of introducing gas into a reaction vessel must be carefully considered when designing for cost efficiency.

The present invention provides a method and apparatus that minimizes random mixing and is less expensive than alternatives by taking advantage of the flow physics associated with nanoparticles. Cyclone technology is used in many industries to remove particles from gas suspensions. However, cyclones are inefficient in separating nanoparticles from a gas stream because their size and mass allow them to follow the gas streamlines and remain within the vortices. This aspect is exploited in the current invention. The current invention has a tangential inlet pipe and central outlet pipe, which allows for an inner helical vortex and an outer helical vortex. In one embodiment, the inlet pipe diameter is between about $\frac{1}{5}$ and $\frac{1}{3}$ the diameter of the reaction vessel and it is located at the upper periphery of the reaction vessel. Further, the inlet pipe is aligned to cause the incoming gas to flow tangentially along the inner wall of the reaction vessel. This creates a flow pattern in which, due to the conservation of angular momentum, flow is divided into an outer, downward-flowing vortex and an inner, upward-flowing vortex between which there is relatively little mixing. Nanoparticles formed in the center of the tank are swept directly out of the tank via the center vortex rather than being dispersed randomly throughout the tank. Nanopowder produced closer to the reactor walls are swept down in the outer vortex and then up the inner vortex. This not only minimizes powder in the reactor, but also minimizes the amount of powder suspended near the tank walls, since the gas flowing along the tank walls consists almost entirely of clean (powder-free) gas arriving from the inlet pipe that remains at a high velocity. This design also minimizes the overall optical opacity of the gas/powder mixture within the tank and minimizes powder buildup on the surface of any viewing windows or external ports. The tangential inlet is also much less expensive to construct and is more compact than either a tapered diffuser or a baffled inlet diffuser.

The cyclonic flow within the reaction vessel helps to prevent large (>10 micron) undesirable by-product particles ("slag") from exiting the reaction vessel through the same outlet as the desirable nanopowder or other reaction products. This is because large particles are subjected to centrifugal particle separation, which is commonly employed throughout many industries. In one embodiment of the present invention, the reaction vessel can be constructed with a conical bottom and a hopper into which these large particles are driven by the cyclonic flow and by gravity. These slag particles can then be removed from the hopper for disposal.

Refer now to the drawings wherein depicted elements are not necessarily shown to scale and wherein like or similar elements may be designated by the same reference numeral through the several views.

FIG. 1 is a diagram of a reaction vessel 100 with cyclonic flow 110 in accordance with an embodiment of the present invention. Item 104 represents an inlet nozzle positioned so that gas 114 flows tangentially into a cylindrical portion of the vessel shown as item 108. The gas 114 flowing tangentially into vessel 108 results in a cyclonic flow. Gas is drawn out of the vessel 100 through outlet nozzle 102. Outlet nozzle 102 is coupled to opening 116 which is positioned near the center of the cylinder 108 and is positioned to help create the inner vortex 112. The outlet 102 is shaped to efficiently redirect the flow into the downstream piping. Therefore, as shown (and oriented) in FIG. 1, inlet nozzle 104 and outlet opening 116 are positioned to create an outer helical vortex (shown as item 110) flowing downward and an inner helical vortex 112 flowing upward. A means for synthesizing nanopowder (such as disclosed in the '693 patent but not shown in FIG. 1) is placed inside the reaction vessel 100 and operated to create nano-sized particles and possibly larger particles as byproducts. The means for synthesizing nanopowder is generally operated within the inner vortex 112. The nano-sized particles are held in suspension within the gas and rapidly carried out of the vessel by the inner vortex 112. Any larger particles created as a byproduct to synthesizing nanopowder tend to be flung outward into the outer vortex where they flow downward with the assistance of gravity. The outer helical vortex has an added benefit of sweeping the walls of the cylinder 108 clean and preventing particles from attaching to the cylinder walls. In FIG. 1, the inlet nozzle 104 and the outlet nozzle 102 are located in the upper portion of cylinder 108 to promote the formation of the inner helical vortex 112 and the outer helical vortex 110. Reaction vessel 100 may also contain additional inlet and outlet ports (not shown) for placing precursor material within the cylinder 108. For clarity, such ports are omitted from FIGS. 1-4.

Figure 2:
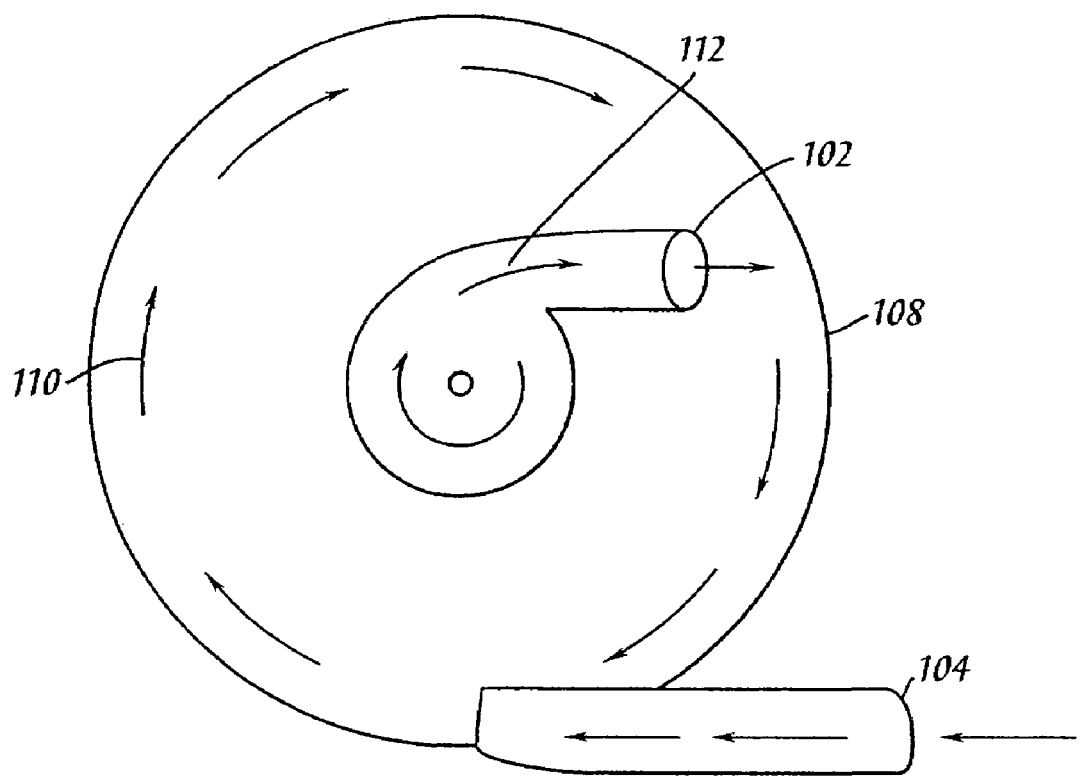
FIG. 2 is a plan view of the reaction vessel from FIG. 1 having cyclonic flow and one outlet nozzle in accordance with an embodiment of the present invention.

FIG. 2 is a plan view of the reaction vessel as shown in FIG. 1. The plan view shown in FIG. 2 shows a gas flowing through inlet nozzle 104 and flowing tangentially along the wall of the cylinder 108. Item 110 represents an outer helical vortex that, as shown, flows simultaneously clockwise and into the page. Item 112 represent an inner helical vortex that, as shown, flows simultaneously clockwise and out of the page. Items 102, 104, 108, 110, and 112 from FIG. 2 correspond to like-numbered items in FIG. 1.

Figure 3:
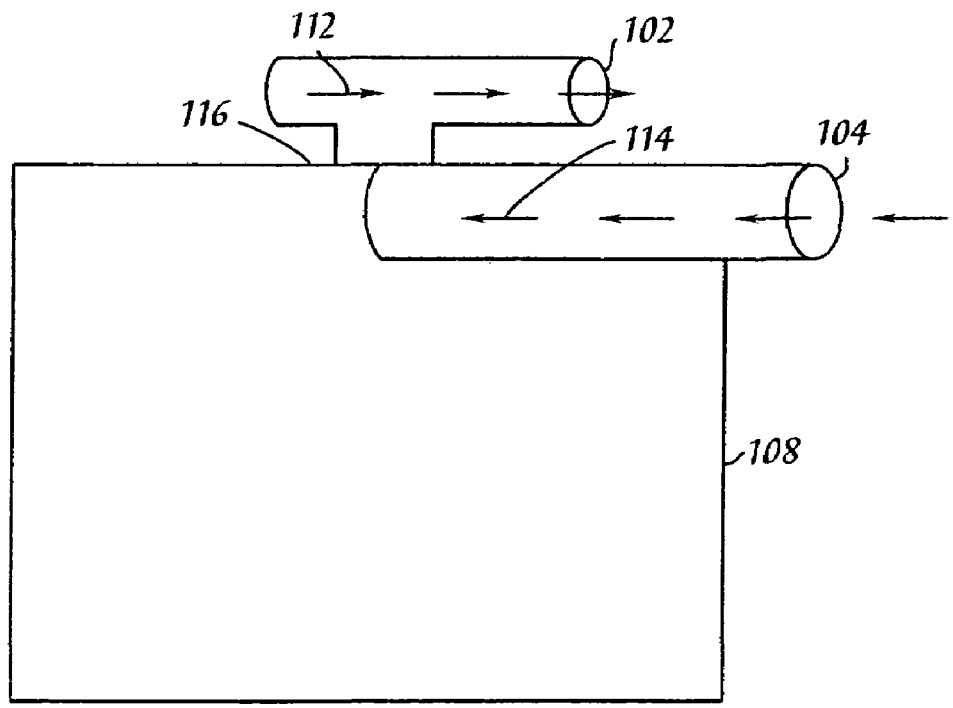
FIG. 3 is an elevation view of the reaction vessel from FIG. 1 having cyclonic flow and one outlet nozzle in accordance with an embodiment of the present invention.

FIG. 3 represents an elevation view of the reaction vessel as shown in FIGS. 1-2. Items 102, 104, 108, 112, 114, and 116 from FIG. 3 correspond to like-numbered items in FIGS. 1-2. Gas flows through inlet nozzle 104 to form an outer helical vortex (not shown) within cylinder 108. An inner helical vortex 112 is formed and the corresponding gas flows through opening 116 and out nozzle 102. A means for synthesizing nanopowder (not shown) is operated within the reaction vessel resulting in a suspension of nanoparticles in the inner helical vortex 112 that flows out the reaction vessel through nozzle 102. Larger particles may be formed as byproducts of synthesizing the nanopowder. The larger particles, with the assistance of gravity, fall and are collected in the bottom of the reaction vessel.

Figure 4:
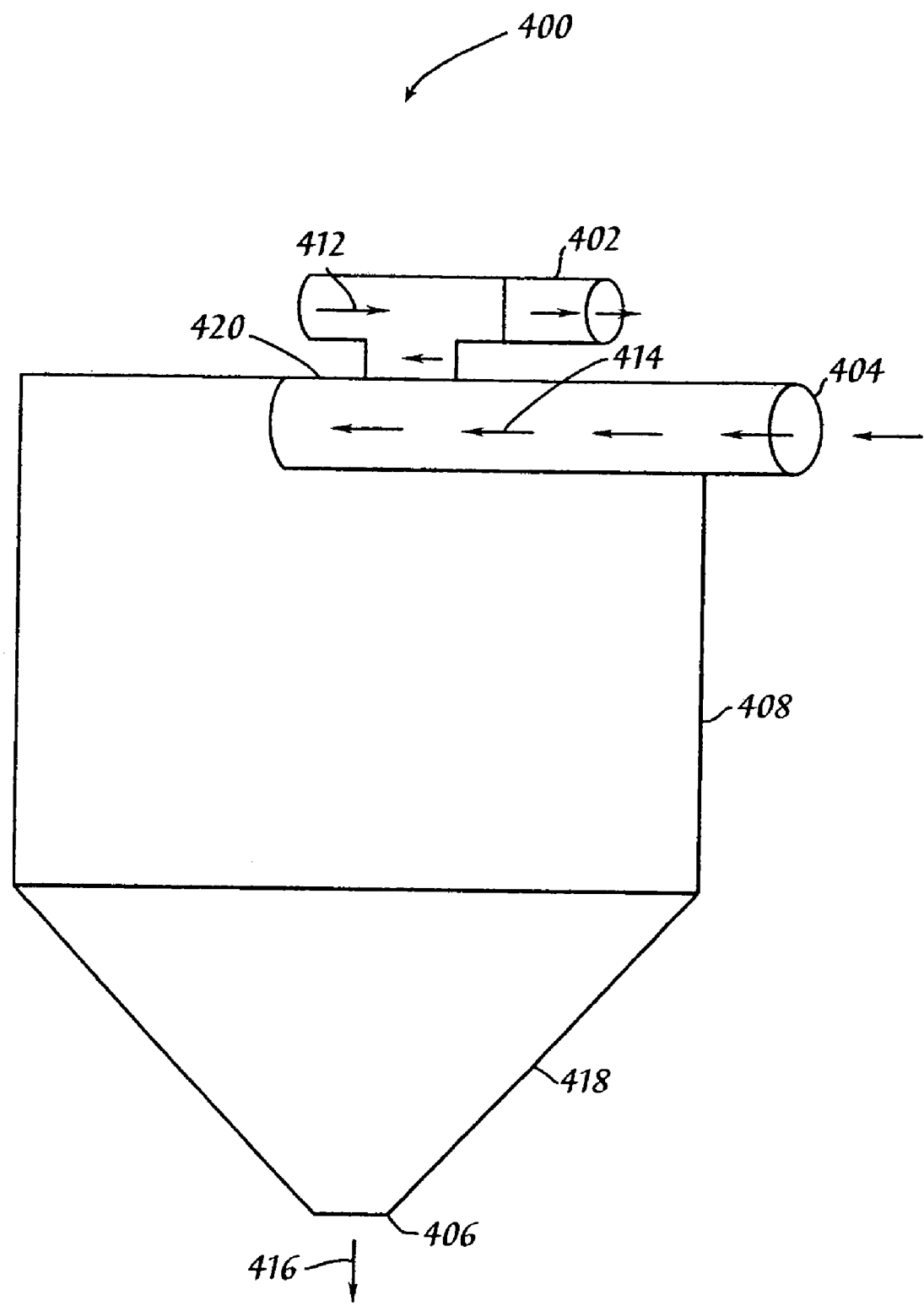
FIG. 4 is an elevation view of a reaction vessel having a cone-shaped section and cyclonic flow in accordance with another embodiment of the present invention.

FIG. 4 is an elevation view of a reaction vessel 400 with a conical-shaped portion 418 and cyclonic flow in accordance with an embodiment of the present invention. Gas flows through inlet nozzle 404 and flows tangentially through cylinder 408 in a downward-flowing, outer helical vortex (not shown). An upward-flowing, inner helical vortex is formed in the innermost portion of cylinder 408 and is shown as item 412 flowing through opening 420 and out nozzle 402. Within the reaction vessel 400, a means for synthesizing nanopowder (not shown) is operated and produces a suspension of nanoparticles that flow out nozzle 402. Larger particles may be produced as a byproduct of the synthesis of nanopowder. The larger particles may be directed by conical section 418 to flow out of the reaction vessel through outlet nozzle 406 as flow 416. A reaction vessel 400 is similar to the reaction vessel 100 (FIG. 1) with the addition of a conical shaped portion below the cylindrical shaped portion 108 (FIG. 1). FIG. 4 represents an elevation view of reaction vessel 400, and a plan view of reaction vessel 400 is omitted because it would be essentially the same as FIG. 2. Reaction vessel 400 may also contain additional inlet and outlet ports (not shown) for placing precursor material, sensors, and instrumentation within the cylinder 408 or to gain access to or to view the interior of cylinder 408. Further, reaction vessel 400 may have one or more viewing ports (not shown) for allowing a technician to view the interior of the reaction vessel to inspect the equipment and nanopowder synthesis. Also, the effectiveness of the separating characteristics of the reaction vessel 400 can be viewed through the viewing window. Further, the viewing window can be used to determine whether particles are collecting on the walls of cylinder 408 or the conical-shaped portion 418. For clarity, such access and viewing ports are also not shown in FIG. 4.

While the present invention uses a conical shaped bottom of the reactor vessel and an exit port to collect large particles, the invention is not limited to this geometry. For example, the exit port 406 could be attached to the bottom of reaction vessel 108 in FIG. 1 and the same principles would apply, although in this case it might collect the large by-product particles with less efficiency.

There are numerous processes available for fabricating very small particles such as nanopowder. The present invention relates to reaction vessels used to produce, separate, and capture such nanopowder. For purposes of this patent, the term "nanopowder" is used; however, other terms may be used for the very small particles that make up nanopowder. For instance, the particles that make up nanopowder may also be referred to as "ultrafine" or "submicron" particles. Such particles may be 1-500 nanometers in size. Such particles may also be referred to as "nanoparticles," "nano-sized," "nanocrystalline," and the like.

In accordance with the present invention, the production of nanopowder can be accomplished through various mechanisms within a reaction vessel having a cyclonic flow of gas. For example, nanopowder may be produced within a reaction vessel by mechanical processing, chemical processing, or thermal processing. Also, nanopowder may be produced using plasma processing, exploding wires, electro-thermal guns, hybrid exploding wire, laser abation, plasma torch synthesis, transferred arc, combustion flame, resistive boat evaporation, microwave synthesis, spark erosion, electron beam evaporation, or sputtering, as well as other processes for producing nanopowder. The subject matter of the present invention is not limited to a particular process for producing nanopowder. For purposes of this patent, the present invention and synthesis is described as if it occurred in the reaction vessel by electro-thermal synthesis. However, the subject matter of the present invention includes synthesis of nanopowder by other means.

Figure 5:
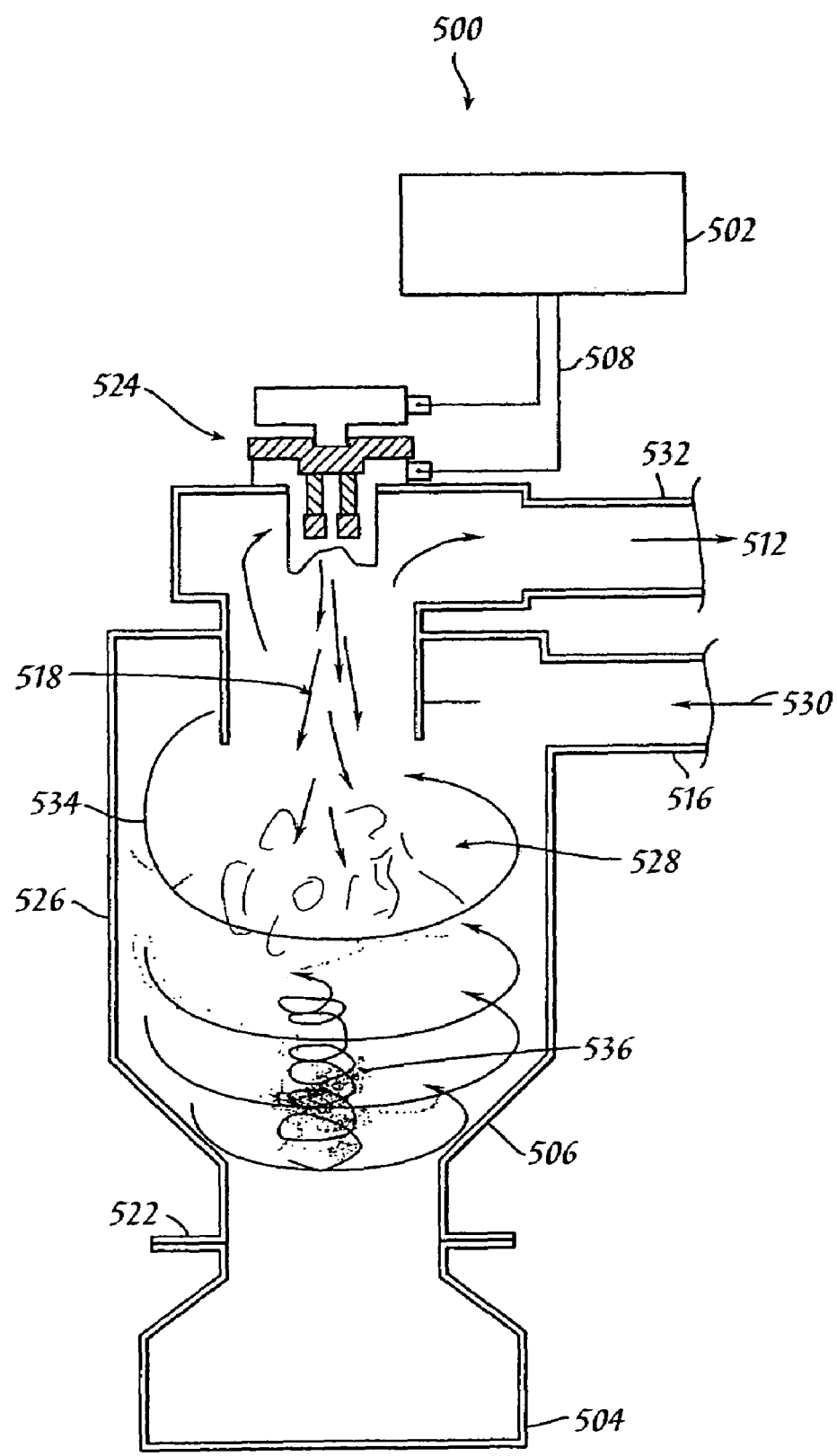
FIG. 5 is a cut-away view of a reaction vessel with an axial discharge electro-thermal gun operable in accordance with an embodiment of the present invention.

FIG. 5 shows a cutaway view of a reaction vessel 500 incorporating an apparatus for synthesizing nanopowder in accordance with the present invention. Item 506 represents a conical shaped portion of the reaction vessel 500 and item 526 represents a cylindrical portion of reaction vessel 500. Gas 530 flows through inlet nozzle 516 into cylindrical portion 526. Gas 530 flows tangentially along the inner wall of cylindrical portion 526 in a pattern comprising a helical vortex shown as item 534. The helical vortex 534 also travels tangentially along the inner wall of the conical portion of the reaction vessel shown as item 506. An inner helical vortex 536 is formed by the flowing gas as a result of the outlet position and shape of reaction vessel 500. While flowing as inner helical vortex 536, the gas collects nano-sized particles (nanopowder) from the expanding cloud shown as item 528 and carries the particles as item 512 through outlet nozzle 532. Item 528 represents an expanding cloud of nanopowder and byproducts produced by synthesis means 524. The nanopowder travels through outlet nozzle 532 while the byproducts fall through outlet nozzle 522 to be collected in the slag hopper shown as item 504. As shown in FIG. 5, the nanopowder is produced by an axial discharge electro-thermal gun shown as item 524. A high-power, pulsed electrical power supply shown as item 502 sends current down an electrical bus shown as item 508 and results in a high-velocity plasma jet shown as item 518 to create the expanding cloud of nanopowder and byproducts shown as item 528. Though reaction vessel 500 is shown with axial-discharge electro-thermal gun 524 to synthesis the nanopowder, other means and apparatuses for synthesizing nanopowder may be incorporated into reaction vessel 500.

Figure 6:
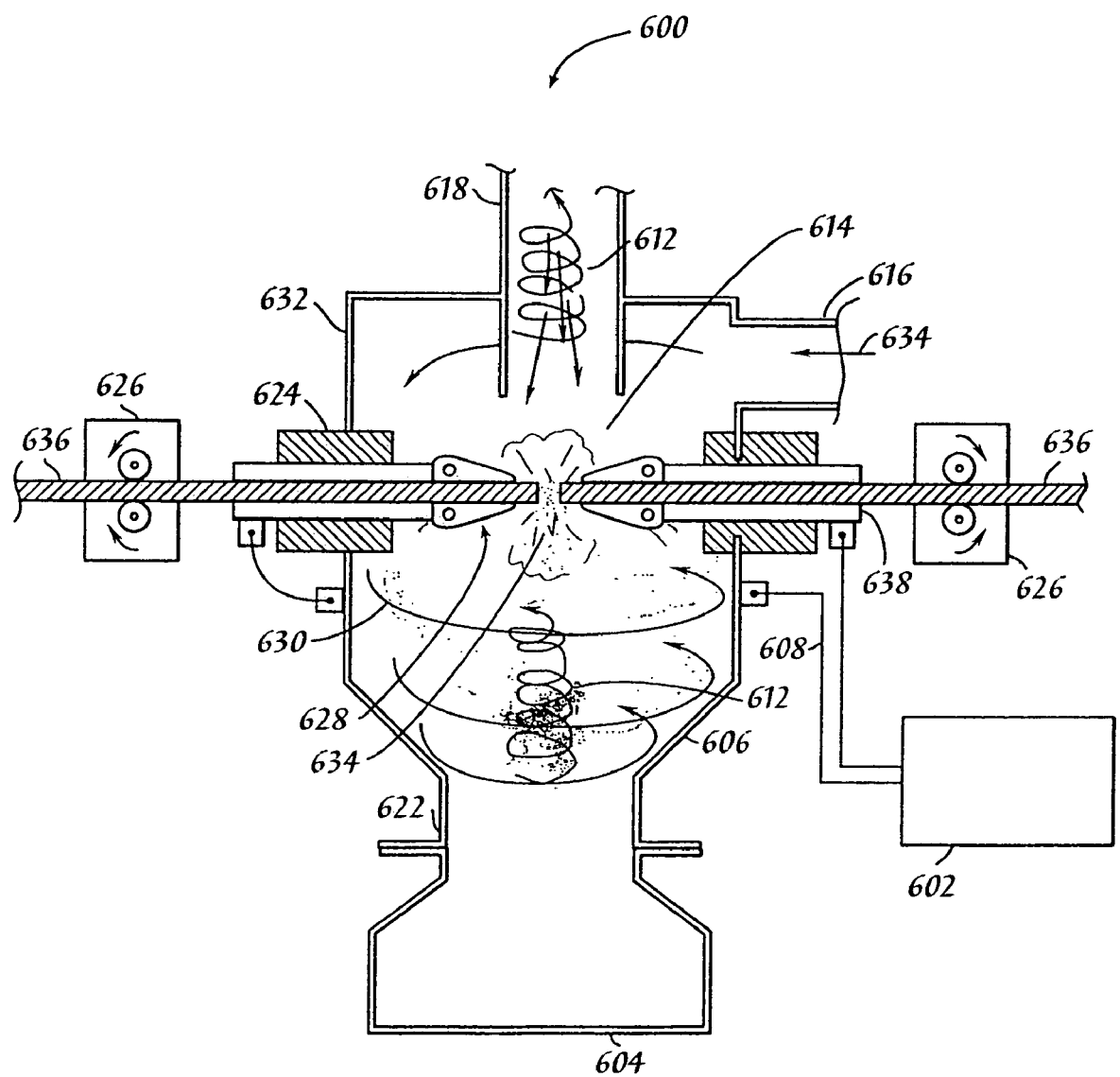
FIG. 6 is a cut-away view of a reaction vessel with a radial gun operable for synthesizing nanopowder in accordance with an embodiment of the present invention.

FIG. 6 is a cut-away diagram of a reaction vessel 600 for synthesizing nanopowder in accordance with the present invention. Reaction vessel 600 comprises a cylinder portion 632 with an inlet nozzle 616. Gas shown as item 634 enters inlet nozzle 616 and flows tangentially along the inner wall of cylinder portion 632 to form a helical vortex shown as item 630. The gas could be any of the commonly known inert gases including helium, neon, argon, krypton, xenon and any other gas that is not a reactant when synthesizing the nanopowder (such as, for example, nitrogen for certain reactions). Alternatively, the gas could be a reactive gas such as oxygen, hydrogen, hydrocarbon, ammonia, silane, nitrogen oxide, and any other gas required to make the desired nanopowder (such as, for example, nitrogen for other certain reactions). Combinations of reactive gases and inert gases may also be used. Rods of metallic precursor material, shown as item 636, are fed into the reaction vessel 600 using rod feeders, shown as item 626. The tips of these form ablative electrodes that comprise the radial gun nanopowder synthesis device. The electrodes 636 are axially aligned with each other within the gas flowing through the reaction vessel 600. Item 602 is the power supply for supplying a high-power pulsed electrical arc between the electrodes shown as item 636. Item 634 represents the high-power pulsed electrical arc between the electrodes 636. This arc ablates the metallic precursor material to create a rapidly expanding cloud of vapor from which the nanoparticles are formed. Item 638 represents a gas seal for preventing any gases inside the reaction vessel 600 from leaking around the metallic precursor material 636 to atmosphere. Item 628 represents a "gripper" for coupling the high-power pulsed electrical discharge to the precursor material 636, and for maintaining the position of the precursor material 636 while the electrical pulse is supplied. Item 622 represents an outlet nozzle coupled to the lower portion of conical section 606. Byproducts formed in the synthesis of nanoparticles are collected in slag hopper 604 after the byproducts fall through outlet nozzle 622. Nanoparticles flow upward in the inner helical vortex shown as item 612. The inner helical vortex 612 flows through outlet nozzle 618 located in the center of the cylindrical portion 632 of reaction vessel 600. Item 608 represents high-current electrical bussing for transmitting the high power electrical discharge from the power supply 602 to the grippers 628. Item 624 represents electrical insulators for insulating the nanopowder synthesis device from the grounded vessel. One distinct advantage of the current invention is the ability to provide convective cooling to the nanopowder synthesis system using moderate flow rates and without causing problems to the synthesis process. Convective cooling of the synthesis components requires high gas velocities. Generally this is accomplished using high flow rates, but this requires larger blowers and increases costs. Additionally the high velocities can often extinguish arcs resulting in problematic nanopowder synthesis. By using a cyclonic flow, high velocities can be achieved at lower flow rates without decreasing the reaction vessel diameter. This results in more efficient cooling of the internal components such as the gripper shown as item 628, the electrical insulators shown as item 624, and precursor material shown as item 636. Additionally, the velocity at the center of the vortex is near zero. This can be exploited by placing the arc in this region so as to prevent the arc from being extinguished by the gas flow. Hence, efficient heat transfer can be accomplished without creating other problems for the nanopowder synthesis systems.

U.S. Pat. No. 5,460,701 teaches a continuous-arc plasma nanoparticle synthesis method that employs a cyclone immediately downstream of the reaction zone in which the nanoparticles are synthesized. In that method, the cyclone simply serves to enhance turbulent mixing of the newly synthesized nanoparticles with the surrounding quench gas to cool the nanoparticles and help prevent agglomeration of the nanoparticles. The present invention differs from this prior art method in that with the present invention the nanoparticles are synthesized in a reaction zone located within the central vortex of the cyclone rather than upstream of the entire cyclone. Rather than merely enhancing turbulent mixing of the nanoparticles with the quench gas, in the geometry of the present invention the cyclonic flow aids in sweeping nanoparticles out of the reaction zone and in clearing the reaction vessel of opaque aerosols, which aids the use of optical instrumentation. The cyclonic flow also helps sweep the reaction vessel wall clean of nanoparticles and other reaction products, aids in separating large-particle reaction by-products from the nanoparticles, and helps cool the nanoparticle synthesis equipment.

Although the present invention and its advantages have been described in detail, it should be understood that various changes, substitutions and alterations can be made herein without departing from the spirit and scope of the invention as defined by the appended claims.

What is claimed is:

1. A reaction vessel for synthesizing materials, comprising:
    (a) a generally cylindrical portion of the vessel having an inner wall connected to a first end and a second end;
    (b) an outlet coupled to the cylindrical portion at the first end, wherein the outlet is positioned substantially concentrically with the inner wall;
    (c) an inlet coupled to the cylindrical portion at or near the first end thereof, wherein the inlet is operable for flowing a gas into the reaction vessel tangentially along the inner wall to form an outer helical vortex flow along the inner wall toward the second end and an inner helical vortex flow toward the first end inside the outer helical vortex;
    (d) at least one feed inlet for supplying precursor material to the reaction vessel; and
    (e) a synthesizer for synthesizing particles of the desired material in suspension within the reaction vessel from the precursor material wherein the double helical vortex movements conveys particles of the desired material out the outlet.

2. The vessel of claim 1, wherein the diameter of the inlet is between about $\frac{1}{5}$ and about $\frac{1}{3}$ of the diameter of the cylindrical portion of the vessel to create relatively high velocity cyclonic gas flow at relatively low flow rates, whereby convective cooling is provided to the synthesizer.

3. The vessel of claim 1, wherein:
    (a) the synthesizer creates both particles of the desired materials and larger byproduct particles;
    (b) the second end of the cylindrical portion is open; and
    (c) the vessel further comprises a generally conical-shaped portion having a larger opening at a first end and a smaller opening at a second end wherein the second end of the cylindrical portion is coupled to the first end of the conical-shaped portion to permit the outer helical vortex to convey the larger byproduct particles out of the cylindrical portion into the conical-shaped portion, whereby the byproduct particles exit the small end of the conical-shaped portion responsive to the cyclonic flow and gravity.

4. The vessel of claim 1, wherein the suspended particles of desired materials comprise a nanopowder.

5. The vessel of claim 1, wherein the production of the particles of desired materials occur within helical vortex and the synthesizer comprises an axial discharge electro-thermal gun.

6. The vessel of claim 1, wherein the production of particles of the desired material occurs within the inner helical vortex and the synthesizer comprises a radial gun synthesis device.

7. The vessel of claim 3, further comprising a container coupled to the smaller opening of the conical-shaped portion, wherein the container is operable for collecting byproduct particles formed by the synthesizer.

8. A method for synthesizing particles of a desired material in a reaction vessel having a generally cylindrical portion and collecting such particles, comprising:
   (a) inducing a gas to flow tangentially through an input at or near a first end of the cylindrical portion along the inner wall thereof wherein the gas forms an outer helical vortex flow along the inner wall toward a second end of the cylindrical portion and an inner helical vortex flow toward the first end of the cylindrical portion;
   (b) introducing a precursor material into the reaction vessel;
   (c) producing from the precursor material a plurality of particles of a desired material suspended in the gas; and
   (d) collecting at least a portion of the plurality of particles of the desired material through an outlet concentric with the inner wall located downstream of the inner helical vortex in the first end of the cylindrical portion.

9. The method of claim 8 wherein the producing step comprises producing both smaller particles of the desired material and larger byproduct particles from the precursor material.

10. The method of claim 9, wherein the step of collecting comprises:
    (a) conveying the byproduct particles by the outer helical vortex flow to the second end of the cylindrical portion;
    (b) separating at least a portion of the desired particles from the byproduct particles as a result of the double helical vortex flow within the reaction vessel;
    (c) collecting the byproduct particles from the reaction vessel through the second end in response to the cyclonic flow and gravity forces on the byproduct particles;
    (d) conveying at least a portion of the desired particles by the inner helical vortex flow downstream to the first end; and
    (e) collecting said desired particles through an output opening concentric with the inner wall in the first end of the cylindrical portion.

11. The method of claim 10, wherein the particles of the desired material comprises nanopowder.

12. The method of claim 10, wherein the step of producing comprises inducing an electric current to flow through the precursor material to produce a plasma.

13. The method of claim 12 wherein the step of producing further comprises quenching the plasma in a gaseous atmosphere to produce the nanopowder within the inner helical vortex.

14. The method of claim 10 wherein the step of producing comprises:
    (a) using an axial discharge electro-thermal gun to create a plasma from the precursor material; and
    (b) quenching the plasma in a gaseous atmosphere to produce the nanopowder within the inner helical vortex.

15. A reactor system for synthesizing desired materials comprising:
    (a) a curved vessel portion having an inner wall shaped around an axis and having a first and second end;
    (b) at least one feed inlet for supplying precursor material to the vessel portion;
    (c) a synthesizer for synthesizing particles of the desired material in suspension within the curved vessel portion from the precursor material;
    (d) an inlet for introducing a gas into the curved vessel portion at or near the first end thereof in a tangential direction to the axis that contributes to the gas flowing in a first helical vortex adjacent to the inner wall around the axis toward the second end of the vessel portion and then flowing in a second helical vortex located within the outer helical vortex from the second end toward the first end;
    (e) a first outlet located in the first end of the vessel portion; and
    (f) wherein the outer helical vortex flow conveys the byproduct particles toward the second end of the vessel portion, the byproduct particles are collected through the opening in the second end of the vessel portion responsive to the cyclonic flow and gravity forces on the byproduct particles, thereby separating them from at least a portion of the desired particle, and at least a portion of the desired particles are conveyed by the inner helical vortex flow toward the first end and out of the first outlet.

16. The system of claim 15, wherein the particles of desired material comprises nanopowder.

17. The system of claim 16 wherein the curved vessel portion comprises a cylindrical-shaped portion having a top end and a bottom end, wherein the first outlet is located in the first end and is concentric with the cylindrical-shaped portion.

18. The system of claim 16, further comprising a generally conical-shaped portion having a larger opening at a first end and a smaller opening at a second end wherein the second end of the vessel portion is coupled to the first end of the conical-shaped portion to permit the outer helical vortex flow to convey the byproduct particles out of the cylindrical portion into the conical-shaped portion, whereby the byproduct particles exit the smaller end of the conical-shaped portion responsive to the cyclonic flow and gravity.

19. The system of claim 18, further comprising a container having an open end coupled to the second end of the conical-shaped portion for collecting the byproduct particles.

20. The system of claim 16 wherein the synthesizer comprises at least one electrode of a precursor material and a power source of high-powered electrical pulses, wherein supplying the precursor material with an electrical current from the power source results in producing the nanopowder within the inner helical vortex.

21. The system of claim 20 further comprising a viewing window coupled to the curved vessel, wherein the viewing window is positioned to provide visual access to the inside of the vessel portion.

22. The system of claim 20, wherein the electrical current from the high power, pulsed discharge initially converts the precursor material into a plasma and the helical vortex gas flow quenches the plasma to produce the particles of nanopowder within the inner helical vortex.

* * * * *